(No Model.) 5 Sheets—Sheet 1.
G. W. HARRINGTON.
METHOD OF AND APPARATUS FOR LINING PIPES WITH LEAD.
No. 485,691. Patented Nov. 8, 1892.
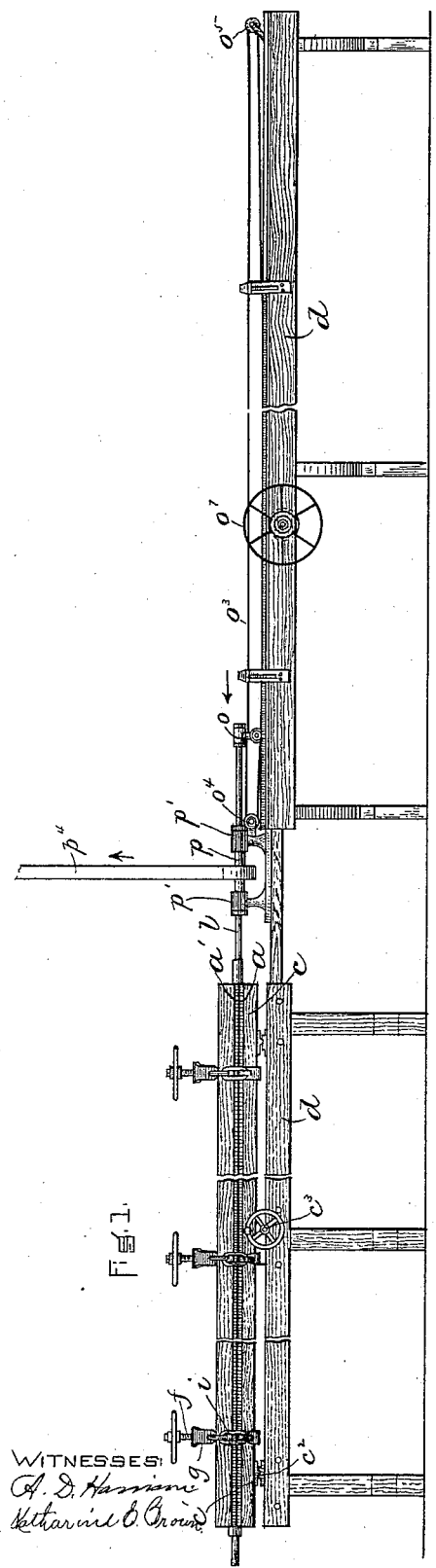
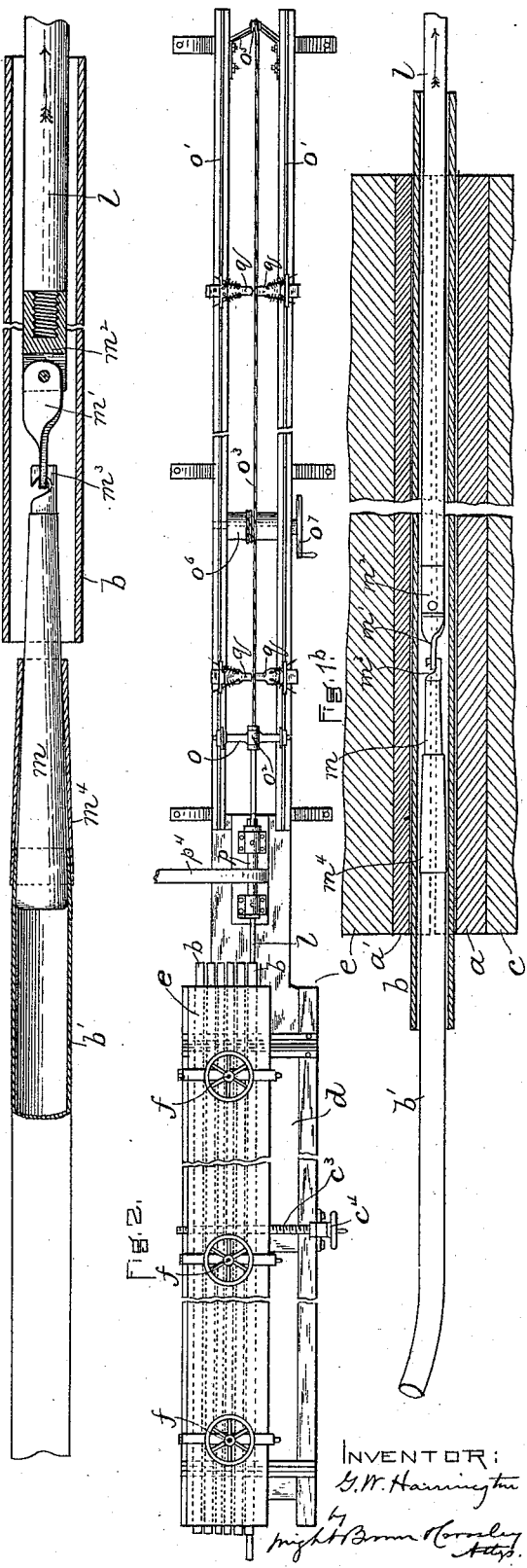
WITNESSES:
INVENTOR:
G. W. Harrington

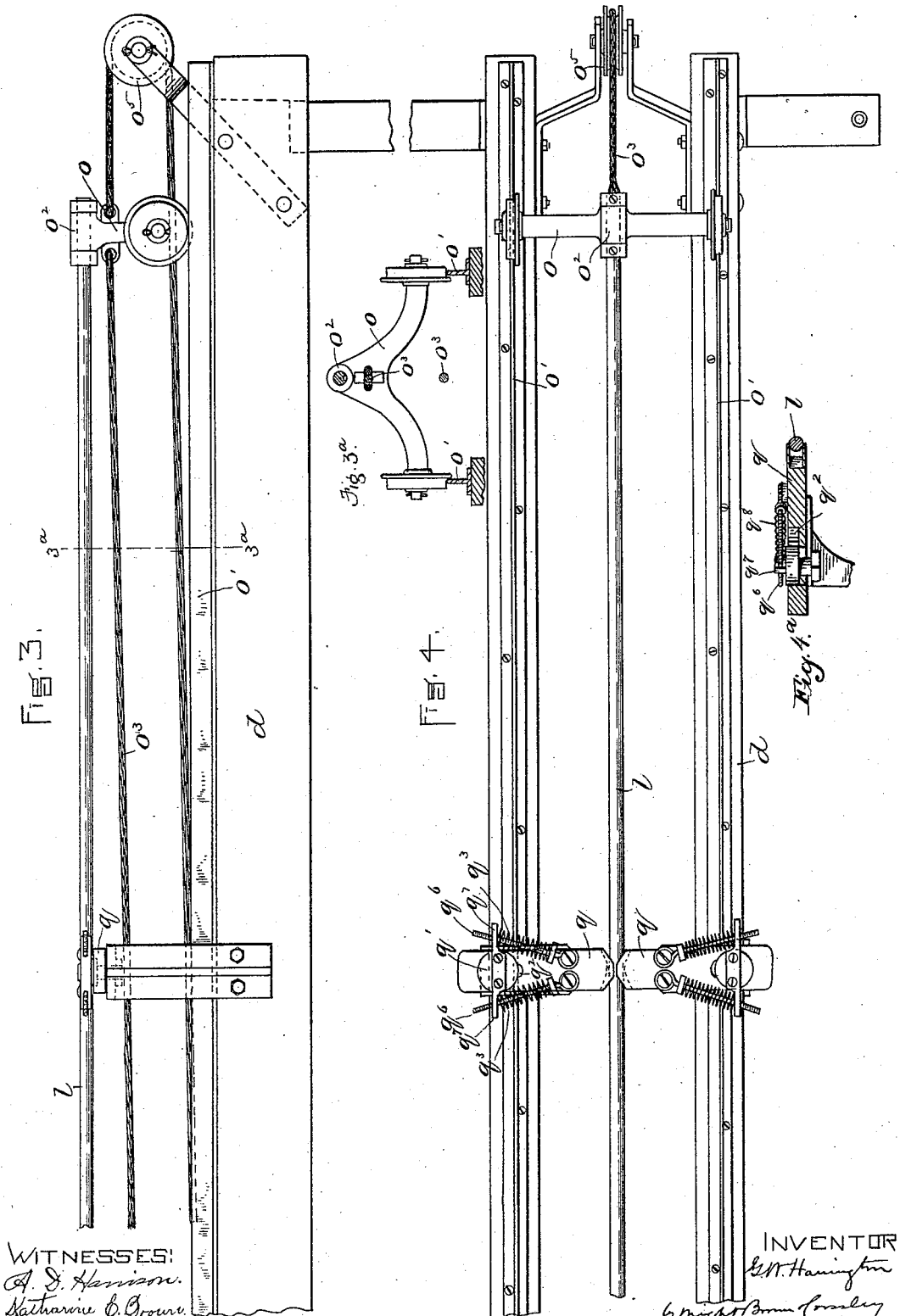

(No Model.) 5 Sheets—Sheet 3.
G. W. HARRINGTON.
METHOD OF AND APPARATUS FOR LINING PIPES WITH LEAD.
No. 485,691. Patented Nov. 8, 1892.
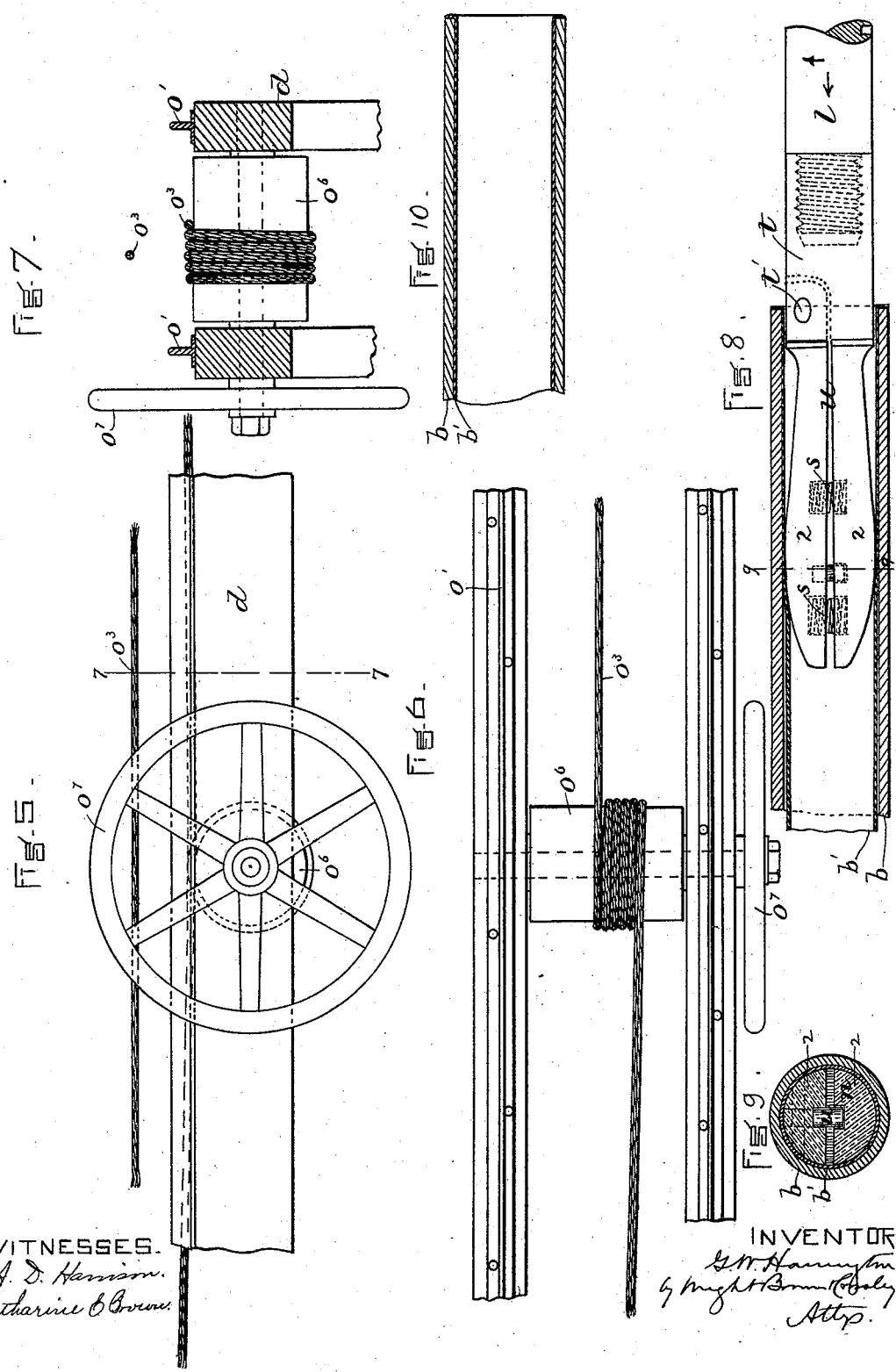

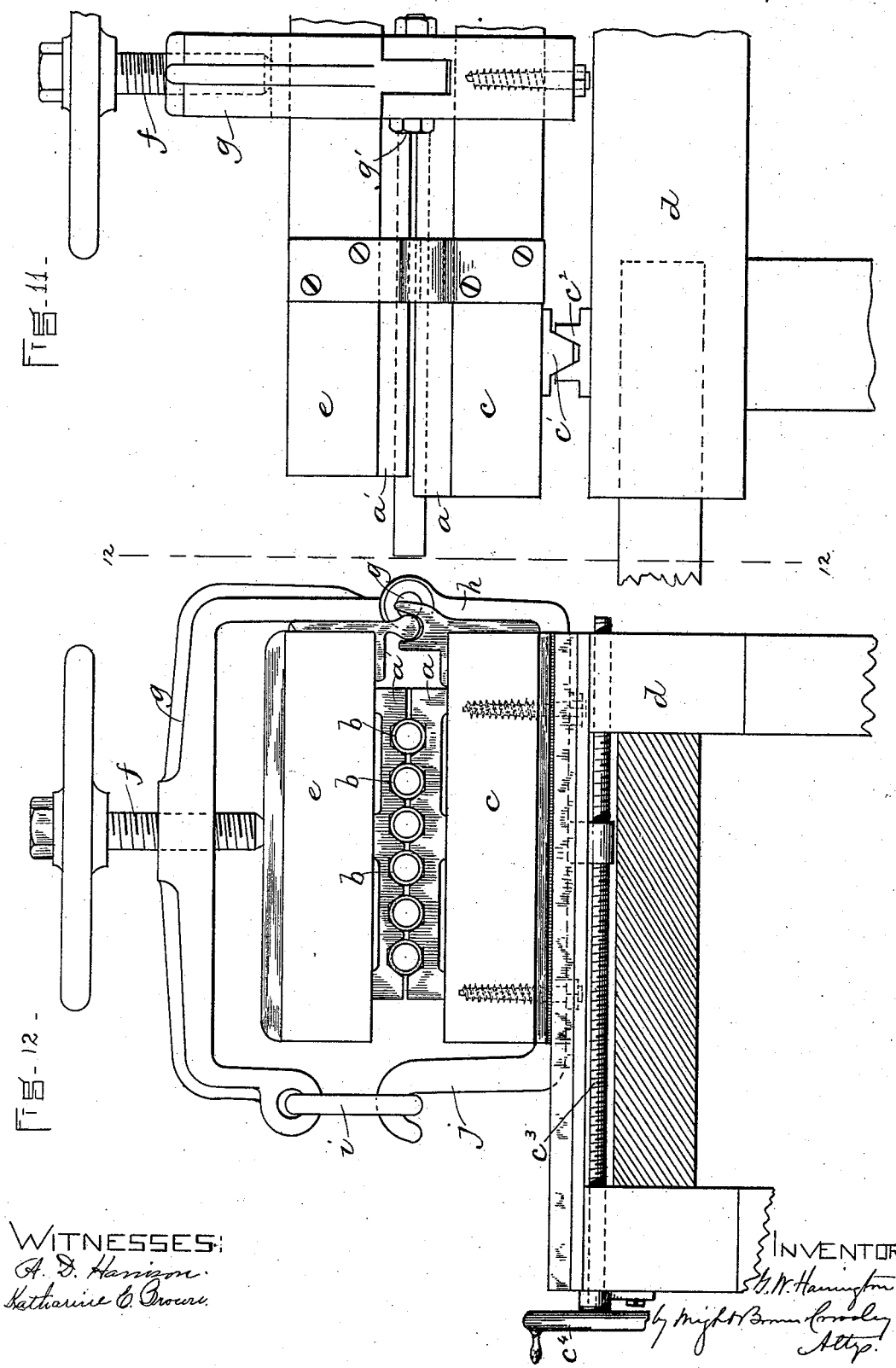

(No Model.) 5 Sheets—Sheet 5.
G. W. HARRINGTON.
METHOD OF AND APPARATUS FOR LINING PIPES WITH LEAD.
No. 485,691. Patented Nov. 8, 1892.
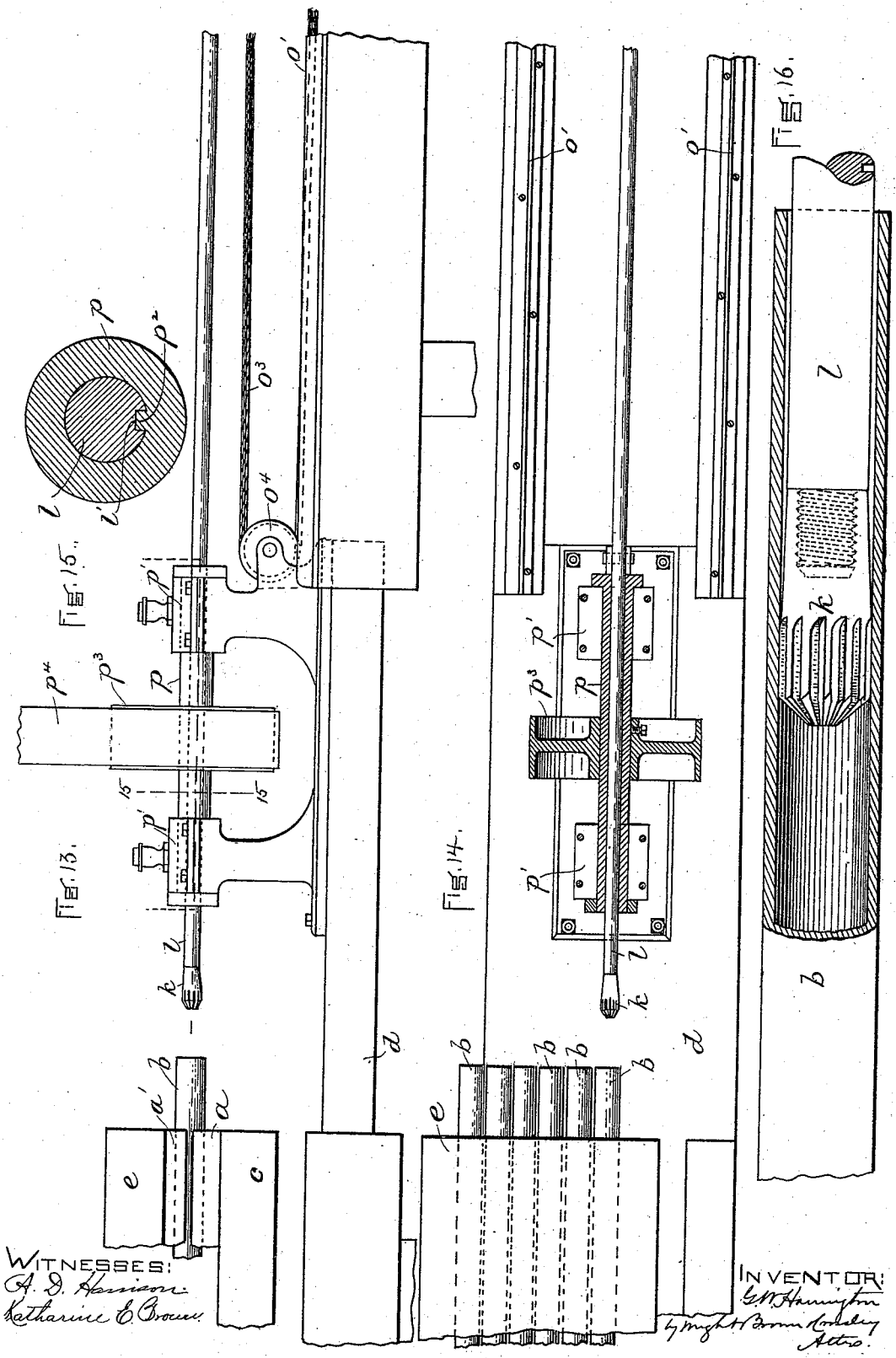

UNITED STATES PATENT OFFICE.

GEORGE W. HARRINGTON, OF WAKEFIELD, MASSACHUSETTS, ASSIGNOR OF ONE-HALF TO D. H. DARLING, OF SAME PLACE.

METHOD OF AND APPARATUS FOR LINING PIPES WITH LEAD.

SPECIFICATION forming part of Letters Patent No. 485,691, dated November 8, 1892.

Application filed August 31, 1891. Serial No. 404,275. (No model.)

*To all whom it may concern:*

Be it known that I, GEORGE W. HARRINGTON, of Wakefield, in the county of Middlesex and State of Massachusetts, have invented certain new and useful Improvements in Methods of and Apparatus for Lining Iron Pipes with Lead, of which the following is a specification.

This invention relates to lead-lined iron pipes or conduits for conducting water and other liquids; and it consists in the improved method and mechanism hereinafter described for producing an iron pipe having a lining of cold-pressed and commercially-pure lead intimately associated with the internal face of the iron pipe.

Of the accompanying drawings, forming part of this specification, Figure 1 represents a side elevation of a machine adapted to carry out my improved method. Figs. 1$^a$ and 1$^b$ represent sectional views illustrating the manner of drawing the lead constituting the lining into the iron pipe. Fig. 2 represents a top view of the machine shown in Fig. 1. Fig. 3 represents a side elevation of a portion of the machine on a larger scale. Fig. 3$^a$ represents a section on line 3$^a$ 3$^a$ of Fig. 3. Fig. 4 represents a top view of the portion of the machine shown in Fig. 3. Fig. 4$^a$ is a detail section of one of the arms for supporting the spindle. Fig. 5 represents a side elevation of another portion of the machine. Fig. 6 represents a top view of the portion of the machine shown in Fig. 5. Fig. 7 represents a section on line 7 7, Fig. 5, looking toward the left. Fig. 8 represents the expanding head or tool used in expanding the lead pipe within the iron pipe. Fig. 9 represents a section on line 9 9 of Fig. 8. Fig. 10 represents a longitudinal section of a portion of a length of iron pipe with a lining formed therein in accordance with my invention. Fig. 11 represents a side elevation of another portion of the machine. Fig. 12 represents a section on line 12 12, Fig. 11, looking toward the right. Fig. 13 represents a side view of a portion of the machine, showing the machine as it appears prior to the operation of reaming out the iron pipe. Fig. 14 represents a top view, partly in section, of the portion of the machine shown in Fig. 13. Fig. 15 represents a section on line 15 15, Fig. 13. Fig. 16 represents a view of the reaming-tool inserted in a length of iron pipe, the latter being shown in section.

The same letters of reference indicate the same parts in all the figures.

The pipe I produce by my invention is intended, primarily, for use in conducting water and particularly for connections between street-mains and buildings supplied with water thereby, my invention being chiefly intended for use in connection with iron pipe of comparatively-small diameter—say, not exceeding two or three inches—although not necessarily limited to such pipe.

The ordinary butt-welded iron pipe of commerce—such as is generally used for conducting water—presents a rough internal surface, which is extremely liable to corrosion and on which accumulations of sediment carried by the water and other foreign matter form quite rapidly, so that in the course of time the pipe, particularly when made of a diameter not exceeding two or three inches, becomes so clogged as to be practically useless. My improved method, hereinafter described, enables pipe of this character to be protected with a lining or inner coating of lead, which will obviate all the serious objections incidental to iron pipe and greatly increase its durability.

In carrying out my invention I take a length of iron pipe and first straighten it by placing it between straightening jaws or clamps $a$ $a'$. It is almost invariably the case that lengths of iron pipe, particularly of small diameter, are more or less distorted or sprung from a straight line. Hence I find that the straightening operation enables me to perform the subsequent operations presently set forth with greater ease and certainty than would otherwise be possible. The straightening-jaws $a$ $a'$ are preferably formed as shown in Figs. 1, 2, 11, and 12, each jaw having a plurality of parallel grooves extending longitudinally along one of its faces, the two grooved faces co-operating and holding a series of lengths $b$ of iron pipe. The jaws are preferably supported by means of a laterally-movable carriage $c$, mounted on a supporting-frame $d$, and pressure is applied to said jaws to straighten and hold the said lengths by means of a platen *e*, bearing upon the upper jaw *a'*, and pressed downwardly by means of screws *f*, said grooves working in yokes *g*, which may be hinged at *g'* to ears *h*, affixed to the bed or carriage *c*, the swinging ends of said yokes being connected detachably by links *i* or other suitable means with hooked lugs *j*, affixed to the bed or carriage *c*. By thus mounting or supporting the jaws I am enabled to move them laterally, so as to hold either of the lengths of pipe *b* in line with the appliances presently described for reaming out said lengths and for drawing the lead linings into them and for expanding said linings. While a length of pipe is clamped between said jaws and is thereby held in a perfectly-straight condition, I introduce into it a reamer *k*, Fig. 16, which is formed to dress off the inner surface of the iron pipe and remove all irregularities therefrom and leave said inner surface in a smooth condition, and of a practically-uniform diameter from end to end. Said reamer is attached to one end of a rotating rod or mandrel *l*, which is provided with means, hereinafter described, whereby it is simultaneously rotated and moved lengthwise to carry the reamer through the length of iron pipe. After the pipe has been reamed out and had a true inner surface imparted to it the reamer is withdrawn and a sufficient quantity of lead pipe *b'* to form a lining for the pipe *b* is drawn into the latter, the lead pipe being so much smaller than the internal diameter of the iron pipe that it can be readily drawn into the latter. I prefer to employ the ordinary commercially-pure lead pipe of commerce, and said pipe for convenience may be drawn from a reel mounted at one end of the jaws *a* *a'* in such position that the pipe in unwinding from the reel will readily enter the iron pipe to be lined.

To draw the lead pipe into the iron pipe, I prefer to utilize the rod or shaft *l*, the reamer *k* being removed from said rod, and a tapering plug *m* engaged with the rod in any suitable way—such, for example, as by a hook *m'* pivotally connected to a sleeve *m²*, screwed upon the rod *l* and engaged with a hook *m³*, attached to the smaller end of the taper plug *m*. (See Figs. 1ª and 1ᵇ.) The larger end of the plug *m* is of such diameter that it closely fits the interior of the lead pipe *b'*. The forward end of the lead pipe is engaged with the plug by means of a tapering sleeve *m⁴*, formed to surround the taper plug, and to receive at its larger end one end of the lead pipe *b'*, said pipe being placed upon the larger end of the plug and then contracted thereon by driving the taper tube *m⁴* upon the portion of the lead pipe that receives the plug. The rod *l* is then moved lengthwise in the direction indicated by the arrow in Figs. 1ª and 1ᵇ by power suitably applied, as hereinafter described, until a sufficient quantity of the lead pipe has been drawn into the iron pipe to completely line the latter, the portion of the lead pipe intended for the lining being then cut off from the main coil. The lead pipe is now resting loosely in the iron pipe, and is not secured to or intimately associated with the inner surface of the iron pipe. I now insert in the lead lining an expanding head or mandrel *n*, Figs. 8 and 9, said mandrel being preferably constructed to expand by spring-pressure, as hereinafter described, and formed to enlarge the lead pipe and expand it to such an extent as to press its external surface closely against the inner surface of the iron pipe, said expanding-head being rotated and moved lengthwise through the lead lining, preferably by means of the rod *l*, to which said head is attached, said rod being rotated and moved forward the same as when it carries the reamer *k*. The expanding-head is so constructed that in passing through the lead lining, as described, it will not only expand the latter, but will also exert such a degree of outward pressure on its outer surface as to compact its material and press its outer surface so closely against the inner surface of the iron pipe that there will be a firm and intimate union between the iron pipe and the lead pipe or lining. The pressure exerted by the expanding-head upon the inner surface of the lead lining gives the latter a finished or burnished internal surface, so that its frictional resistance to the water passing through it is reduced to the minimum, and any projections or protuberances which might become dislodged and flow off with the water are prevented.

The expanding-head is preferably composed of a plurality of sections 2 2, the head being here shown as composed of two sections, although my invention is not limited to this number. Said sections are movable toward and from each other, and are normally pressed apart by a spring or springs. I have here shown two springs *s s* interposed between the sections, so as to exert outward pressure and normally force the sections apart. One of the sections is here shown as formed on or attached rigidly to a collar *t*, which is screwed upon the rod *l*, while the other section is pivoted at *t'* to said collar. The acting surfaces of the sections are substantially semicircular, as shown in Fig. 9, so that they correspond closely to the circular form of the inner surface of the lead lining. To prevent lateral displacement of the pivoted section, I place a dowel *u* loosely in sockets formed in the inner surfaces of the sections 2 2. It will be seen that by using an expanding-head which is adapted to expand automatically I obtain a yielding pressure upon the lead lining which enables it to conform closely to any slight irregularities which may exist in the iron pipe as well as in the thickness of the lead lining. My invention is not limited, however to this construction of expanding-head, as I may employ a head or mandrel which does not expand automatically.

After the lining has been expanded, as described, and the expanding-head has been withdrawn the ends of the lining, which are preferably left extending somewhat outside of the ends of the iron pipe are turned upwardly to cover the ends of the iron pipe and furnish lead surfaces or washers adapted to abut against the ends of the adjoining lengths; or, if preferred, the ends of the lead lining may be trimmed off flush with the ends of the iron pipe.

It will be observed that the iron pipe is confined between the jaws $a$ $a'$ during each of the above-described operations or steps, so that the pipe is held in perfectly true and straight condition while it is being reamed and while the lining is being expanded to unite it with the iron pipe. The carriage $c$, that supports the jaws $a$ $a'$, is preferably provided with shoes $c'$, running in fixed guides $c^2$ on the supporting-frame $d$. The carriage may be moved laterally to bring each of the lengths of iron pipe held by it successively into engagement with the rod or shaft $l$ in any suitable manner, preferably by means of an adjusting-screw $c^3$, Figs. 1 and 2, mounted in bearings on the supporting-frame and engaged with a nut (see Fig. 12) on the carriage, said screw being provided with a hand-wheel $c^4$, by which it may be rotated. It will be seen that the hinged yokes $g$, supporting the pressure-screws $f$, enable the screws and the platen $e$ to be moved to permit the removal of the upper jaw or clamp $a'$.

The preferred means for operating the rod or spindle $l$ are as follows: $o$ represents a carriage adapted to travel on tracks $o'$ $o'$ on the supporting-frame, said carriage having wheels formed to run on said tracks. The rear end of the rod or spindle $l$ is journaled in a bearing $o^2$ on said carriage, and said spindle is moved endwise by any suitable means. I have here shown as the means for moving the spindle a cord or chain $o^3$, attached at its ends to the carriage $o$ and passing over guide-pulleys $o^4$ $o^5$, mounted in fixed bearings on the supporting-frame, said cord being wound about a shaft or drum $o^6$, journaled in bearings in the frame and provided with a hand-wheel $o^7$, by which the operator may rotate it. It will be seen that the rotation of the drum $o^6$ causes the cord $o^3$ to move endwise in one direction or the other, and thus move the carriage $o$ and rod or spindle $l$. The spindle is rotated while moving endwise by means of a sleeve or collar $p$, which is journaled in fixed bearings $p'$ $p'$ on the supporting-frame, and is provided with a spline or feather $p^2$, Fig. 15, engaged with a groove $l'$, extending lengthwise of the rod or spindle $l$. The sleeve $p$ is rotated by means of a pulley $p^3$, which is driven by a belt $p^4$ from a suitable driving-shaft. It will be seen that the engagement of the rotating sleeve $p$ with the the rod or spindle $l$ by means of the feather-and-groove connection causes the spindle to rotate while it is moving endwise. To support the spindle when it is retracted, I provide pivoted guides, which are composed of arms or levers $q$ $q$, arranged in pairs at opposite sides of the spindle, said arms being pivotally connected to the supporting-frame by bolts at $q'$ $q'$, passing through slots $q^2$ in the arms $q$, said slots permitting the arms to move endwise, so that they may bear yieldingly on the spindle, their pivotal connection enabling them to yield in either direction to permit the bearing $o^2$ to pass between them. The guides $q$ $q$ are supported by springs $q^3$ $q^3$, each guide having two springs, the two being arranged to counterbalance each other, so that normally the arms $q$ are held in the position shown in Figs. 2 and 4. The springs are supported by rods $q^6$, adapted to slide in fixed ears or guides $q^7$.

My invention is not limited to the various details of construction herein shown and described, and the same may be modified and changed in various respects without departing from the spirit of my invention. Any other suitable means may be employed for rotating the spindle $l$ and moving it endwise and for clamping or holding the iron pipe-lengths in a straight position. If desired, the pipe-holding jaws may be formed to hold only one pipe-length instead of a series of lengths.

I claim—

1. The improved method of lining iron pipe, consisting in simultaneously and equally compressing and holding all portions of a length of pipe and while the pipe is so held expanding a length of lead lining into firm and intimate union with the inside thereof, substantially as described.

2. In a machine for lining iron pipe, the combination of pipe-holding jaws or clamps, means for adjusting the pressure of the jaws, a tool-carrying rod or spindle arranged in line with said jaws, means for rotating said spindle, and means for moving the spindle endwise while it is rotating and thereby inserting said spindle in a pipe held by said jaws, as set forth.

3. In a machine for lining iron pipe, the combination of pipe-holding jaws or clamps, means for adjusting the pressure of the jaws, a tool-carrying rod or spindle located in line with said jaws, a traveling carriage having a bearing for the rear end or portion of said spindle, a sleeve or rotary bearing engaged with said spindle by a feather-and-groove connection, whereby the spindle is permitted to move endwise independently while rotating with the said sleeve, means for rotating the sleeve and spindle, and means for moving the spindle endwise to insert it in a pipe held by said jaws, as set forth.

4. In a machine for lining iron pipe, the combination of pipe-holding jaws or clamps, a tool-carrying rod or spindle located in line with said jaws, a traveling carriage having a bearing for the rear end or portion of said spindle, a sleeve or rotary bearing engaged with said spindle by a feather-and-groove connection, whereby the spindle is permitted to move endwise independently while rotating with the said sleeve, a driven pulley affixed to said sleeve, a cord or chain engaged with said carriage, guides for said cord, and a shaft engaged with said cord and adapted to impart endwise motion thereto, as set forth.

5. The combination, with the tool-carrying rod or spindle and means for moving it endwise, of the pivoted yieldingly-supported guides for laterally sustaining said spindle, as set forth.

In testimony whereof I have signed my name to this specification, in the presence of two subscribing witnesses, this 26th day of August, A. D. 1891.

GEORGE W. HARRINGTON.

Witnesses:
C. F. BROWN,
A. D. HARRISON.